United States Patent
Hoshi et al.

(10) Patent No.: US 6,266,447 B1
(45) Date of Patent: *Jul. 24, 2001

(54) CODING APPARATUS

(75) Inventors: Nobuhiro Hoshi, Yokohama; Shingo Ikeda, Kawasaki, both of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/420,633

(22) Filed: Apr. 12, 1995

Related U.S. Application Data (63) Continuation of application No. 08/064,883, filed on May 24, 1993, now abandoned.

(30) Foreign Application Priority Data

| Jun. 9, 1992 | (JP) | 4-149470 |
| Oct. 6, 1992 | (JP) | 4-292214 |

(51) Int. Cl.⁷ ................ G06K 9/36; G06T 9/00
(52) U.S. Cl. .......... 382/236; 382/238; 382/239; 348/400.1; 348/419.1
(58) Field of Search ................ 382/233, 234, 382/235, 236, 238, 239; 348/397, 400, 411, 420, 49, 397.1, 400.1, 411.1, 419.1, 420.1

(56) References Cited

U.S. PATENT DOCUMENTS

| 4,217,609 | * | 8/1980 | Hatori et al. | 348/412 |
| 4,562,468 | * | 12/1985 | Koga | 348/413 |
| 4,608,607 | * | 8/1986 | Adachi | 358/261.3 |
| 4,691,329 | * | 9/1987 | Juri et al. | 382/56 |
| 4,797,741 | * | 1/1989 | Sato et al. | 382/56 |
| 4,831,439 |   | 5/1989 | Fedele et al. | 358/133 |
| 4,888,640 |   | 12/1989 | Acampora et al. | 358/133 |
| 4,903,124 |   | 2/1990 | Hoshi et al. . | |
| 4,924,311 |   | 5/1990 | Ohki et al. | 358/133 |
| 4,929,946 | * | 5/1990 | O'Brien et al. | 341/51 |
| 4,959,868 | * | 9/1990 | Tanioka | 382/56 |
| 4,965,754 | * | 10/1990 | Stansfield et al. | 358/133 |
| 4,999,704 | * | 3/1991 | Ando | 358/133 |

(List continued on next page.)

FOREIGN PATENT DOCUMENTS

| 0267581 | | 5/1988 | (EP) . | |
| 0444839 | | 9/1991 | (EP) . | |
| 0474388 | | 3/1992 | (EP) . | |
| 2691272 | | 11/1993 | (FR) . | |
| 5091782 | * | 2/1992 | (GB) | 382/56 |
| 5109437 | * | 4/1992 | (GB) | 382/56 |

OTHER PUBLICATIONS

ISO/IEC JTC1/SC29/WG11 'Coding of moving pictures and associated audio for digital storage media', Apr. 20, 1992, International Organization for Standardization, pp. 117, 58–63, 76–94, 113–118, 148–157 and 157–164.

R. Plompen 'Motion Video Coding for Visual Telephony'1990, PTT Research NEHR Labs., NL, Leidschendam, p. 252.

Primary Examiner—Jon Chang
(74) Attorney, Agent, or Firm—Fitzpatrick, Cella, Harper & Scinto (57) ABSTRACT

A coding apparatus includes a large block forming unit for forming a large block of sample values of an input signal, a small block forming unit for dividing the large block into a plurality of small blocks, a first coding unit for coding the small blocks of the input signal by using a difference signal obtained by subtracting a predicted value from the small blocks of the input signal, a second coding unit for coding the small blocks of the input signal without using the difference signal, and a selecting unit for selecting the first or second coding unit in units of large blocks.

18 Claims, 7 Drawing Sheets

U.S. PATENT DOCUMENTS

| | | | |
|---|---|---|---|
| 5,045,852 | * | 9/1991 | Mitchell et al. ........................ 341/51 |
| 5,054,103 | * | 10/1991 | Yasuda et al. ..................... 358/261.2 |
| 5,089,888 | * | 2/1992 | Zdepski et al. ....................... 348/405 |
| 5,122,875 | * | 6/1992 | Raychaudhuri ....................... 348/419 |
| 5,177,453 | * | 1/1993 | Clark ...................................... 341/51 |
| 5,185,819 | * | 2/1993 | Ng et al. ................................ 382/56 |
| 5,223,926 | * | 6/1993 | Stone et al. ............................ 382/56 |
| 5,301,242 | * | 4/1994 | Gonzales et al. ...................... 382/56 |
| 5,644,660 | * | 7/1997 | Bruder .................................. 382/236 |

* cited by examiner

CODING APPARATUS

This application is a continuation of application Ser. No. 08/064,883 filed May 24, 1993 now abandoned.

BACKGROUND OF THE INVENTION

1. Field of the Invention

The present invention relates to a coding apparatus for performing coding by adaptively switching two or more coding systems.

2. Related Background Art

Conventionally, various coding systems have been proposed in order to reduce the quantity of transmission data in digitally transmitting image information.

One of the proposed coding systems is to perform coding by switching intraframe coding and interframe coding.

The intraframe compression is a system of reducing the quantity of information by using the characteristic of an image that neighboring pixels have similar brightnesses and similar colors.

In the bulk of an actual image, such as a portion of sky or wall of an image, brightnesses and colors respectively continue at substantially the same levels, and so compression of about 1/5 to 1/10 is possible even by the use of the intraframe compression alone.

The interframe compression is a system of obtaining images from corrected information alone by using analogous images.

In normal dynamic images, patterns of adjacent frames are similar to each other although there are some movements or deformations. By taking advantage of this characteristic, the similarity (e.g., movement, color, and brightness) between a frame to be compression-coded and its adjacent frame is calculated. On the basis of this calculation, a "predicted value," i.e., the value of a frame which is more similar to the "frame to be coded" than the "adjacent frame" is calculated.

Subsequently, only information indicating the difference between the frame to be coded and the "predicted value" is coded (recorded and transmitted). For this reason, the quantity of data (the quantity of correction) is reduced.

That is, when a person moves to the right in a dynamic image in which only the person is shown, pixels at which the person exists in the immediately preceding frame, including correction information of the movement, correspond to the predicted value, and a value obtained by subtracting the predicted value from the whole pixels which have moved to the right corresponds to the difference.

It is generally known that when compression is performed by the interframe processing in conventional coding apparatuses, if an error occurs in a transmission path, this error propagates. Therefore, the intraframe processing is automatically performed after the interframe processing is performed a predetermined number of times.

The quantity of data per frame of a coded image is approximately 16K to 25K bytes, in the intraframe processing, and approximately 7K to 10K bytes, in the interframe processing.

That is, the quantity of generated data in the intraframe processing is generally larger than that in the interframe processing.

When the intraframe coding is performed periodically, therefore, the quantity of generated data abruptly increases if quantization is performed by using the immediately preceding quantization step (the quantization step used in the interframe coding), and this poses a problem of a transmission rate.

To reduce the quantity of generated data, however, if coding is performed while changing the quantization step, another problem of degradation in image quality arises.

In addition, when compression coding is performed by using DCT (Discrete Cosine Transform), no bias occurs in generated information with respect to a DC (direct current) component in the intraframe compression processing. This makes it impossible to reduce the quantity of information by the use of entropy coding (in which the quantity of information generated is reduced by assigning a short codeword to information which is generated at a high probability and a long codeword to information which is generated at a low probability).

The above problems take place in coding apparatuses (having at least a predictive coding mode) for performing coding by adaptively switching a plurality of coding modes.

Under these circumstances, the present invention is directed to a coding apparatus which prevents degradation in signals by eliminating the above conventional problems.

SUMMARY OF THE INVENTION

The present invention has been made in consideration of the above situations and has as its object to provide a coding apparatus which prevents degradation in signals by eliminating the above conventional problems.

According to one preferable aspect of the present invention, there is provided a coding apparatus comprising block forming means for forming a block of sample values of an input signal, coding means having a first coding mode, in which the block of the input signal is coded by using a difference signal obtained by subtracting a predicted value from the block of the input signal, and a second coding mode, in which the block of the input signal is coded without using the difference signal, comparing means for comparing a data quantity of the difference signal with a data quantity of the input signal in units of blocks, counting means for counting the number of coding operations performed in the first coding mode, and selecting means for selecting one of the coding modes in accordance with outputs from the comparing means and the counting means.

Other objects and advantages of the invention will become apparent from the following detailed description taken in conjunction with the appended claims.

DETAILED DESCRIPTION OF THE PREFERRED EMBODIMENTS

A coding apparatus of the first embodiment according to the present invention will be described in detail below.

Figure 1:
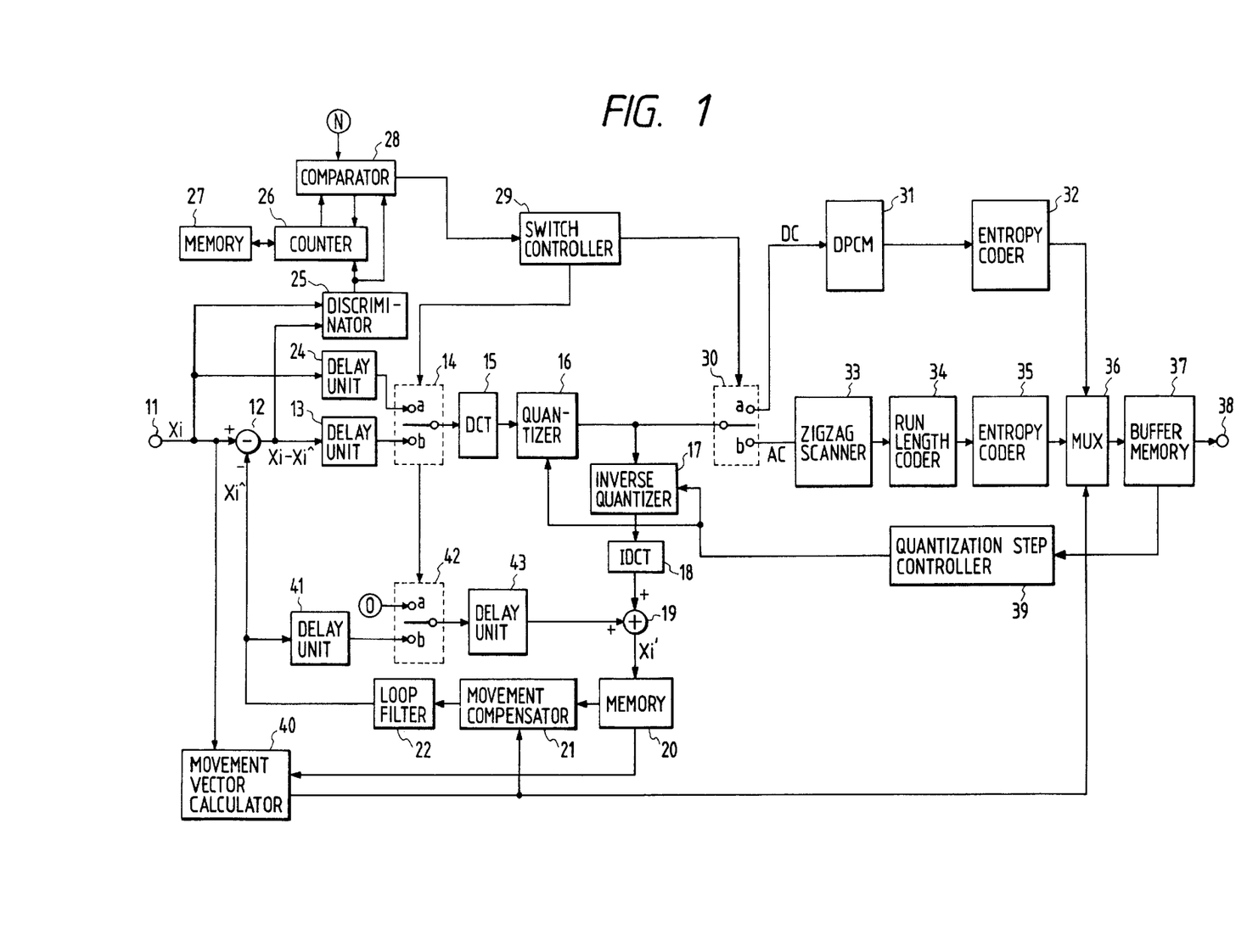
FIG. 1 is a block diagram showing a coding apparatus of the first embodiment according to the present invention.

FIG. 1 is a block diagram showing the arrangement of the coding apparatus of the first embodiment.

Referring to FIG. 1, input digital image data Xi (to be referred to as an intraframe signal hereinafter) from an input terminal 11 is supplied to a subtracter 12, a discriminator 25, and a delay unit 24.

The delay unit 24 delays the data intraframe signal Xi by a time that the discriminator 25 (to be described later) requires, and outputs the signal to a terminal a of a switch 14.

The subtracter 12 calculates a difference Xi−Xi^ (to be referred to as an interframe difference signal hereinafter) between the input image data Xi from the input terminal 11 and image data Xi^ of an immediately preceding frame, which is predicted by a movement compensator 21 and subjected to two-dimensional low-pass filter processing performed by a loop filter 22.

A delay unit 13 delays the interframe difference signal Xi−Xi^ by a time that the discriminator 25 requires, and outputs the signal to a terminal b of the switch 14.

The discriminator 25 compares the data quantity of the intraframe signal Xi with that of the interframe difference signal Xi−Xi^ and supplies the comparison result to a comparator 28. Note that the comparison of data quantities is performed in units of macroblocks (to be described later).

The value of a counter 26 is set by reading out the value from a memory 27. If the discriminator 25 discriminates that intraframe compression is to be performed, the value of the counter 26 is reset, and this reset value is stored in the memory 27.

If, on the other hand, the discriminator 25 discriminates that interframe compression is to be performed, the value of the counter 26 is counted up, and this output value from the counter 26 is supplied to the comparator 28 and stored in the memory 27.

If the discriminator 25 discriminates that the intraframe compression processing is to be performed, the comparator 28 causes a switch controller 29 to close the switch 14 and a switch 42 to their respective terminals a.

If the discriminator 25 discriminates that the interframe compression processing is to be performed, the comparator 28 compares the output value from the counter 26 with a preset predetermined number N and supplies the comparison result to the switch controller 29.

If the comparator 28 determines that the output value is smaller than the predetermined number N, the switch controller 29 closes the switches 14 and 42 to their respective terminals b.

If, on the other hand, the comparator 28 determines that the output value is larger than the predetermined number N, the switch controller 29 closes the switches 14 and 42 to the terminals a, performing the intraframe compression.

Figure 2:
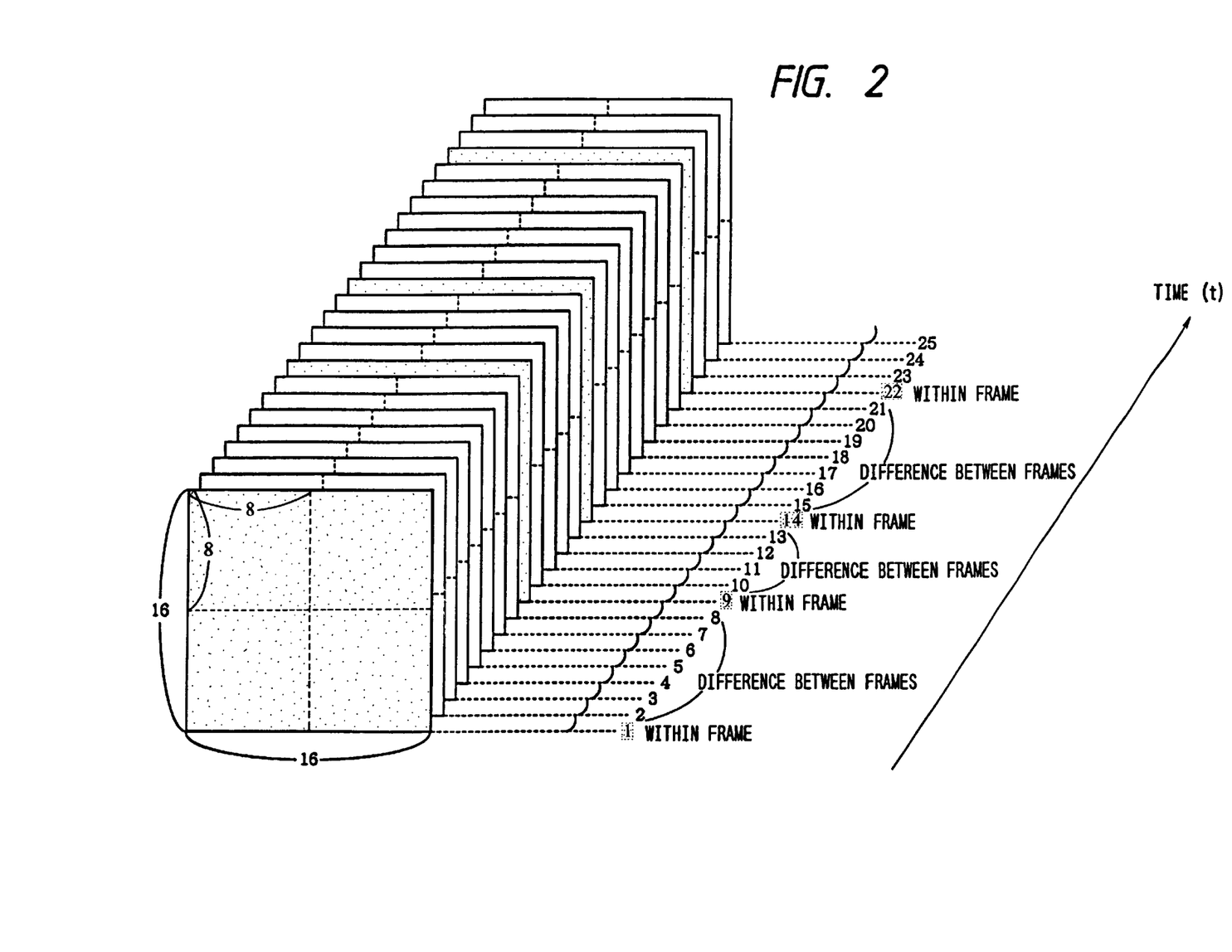
FIG. 2 is a view for explaining the operation of the apparatus shown in FIG. 1.

FIG. 2 is a view for explaining the above operation in detail.

Referring to FIG. 2, the intraframe processing is performed each time eight blocks are processed assuming that N=8.

The discriminator 25 shown in FIG. 1 discriminates, at t=14, that the intraframe compression processing is to be performed, and, at t=9 and 22, that the intraframe processing is to be forcibly performed each time eight blocks are processed.

In FIG. 2, one block is constituted by 64 pixels, eight pixels in each of the row and column directions, and four of these blocks form a large block (to be referred to as a macroblock hereinafter). Switching between the intraframe processing and the interframe processing is performed in units of macroblocks.

Assume that a probability at which the intraframe compression processing is discriminated is p(t), and that the intraframe compression processing is forcibly performed once for every N frames. In this case, a total probability P(t) of the intraframe processing is given by:

$$P(t)=p(t)+1/N \tag{1}$$

Assuming that a probability at which the discriminator 25 of this embodiment discriminates that the intraframe compression processing is to be performed is p(t), and that the intraframe processing is performed once for every N frames, a total probability P'(t) of the intraframe processing is given by:

if $p(t)<1/N$, $$P'(t)=1/N \tag{2}$$

and if $p(t)>1/N$, $$P'(t)=p(t) \tag{3}$$

Equations (1), (2), and (3) above yield:

$$P'(t)<P(t)$$

This demonstrates that the probability of the intraframe compression coding in this embodiment is lower than that in the operation in which the intraframe compression is forcibly performed once for every N frames.

Referring back to FIG. 1, the intraframe signal Xi or the interframe difference signal Xi−Xi^, which is selected by the switch 14, is supplied to a discrete cosine transformer (DCT) 15 and subjected to discrete cosine transform. Note that a block unit that is DCT-processed and coded is an 8×8 block unit.

The transform coefficient transformed by the DCT 15 is quantized by a quantizer 16. The quantized data is supplied to an inverse quantizer 17 and a switch 30.

The inverse quantizer 17 inversely quantizes the data back into the transform coefficient and supplies the coefficient to an inverse discrete cosine transformer (IDCT) 18.

The IDCT 18 transforms the transform coefficient into an intraframe signal Xi' or an interframe difference signal (Xi−Xi^)' and supplies the signal to an adder 19.

The adder 19 adds a predicted value Xi^, which a delay unit 43 delays by a time that the DCT 15, the quantizer 16, the inverse quantizer 17, and the IDCT 18 require, or value "0", and the intraframe signal Xi' or the interframe difference signal (Xi−Xi^)', and supplies the sum to a memory 20.

The output Xi' from the adder 19 is called a local decoded value, which is decoded image data.

The local decoded value Xi' is stored in the memory 20 and used as predicted data delayed by one frame.

A movement vector calculator 40 compares the image data Xi with the image data Xi' of the immediately preceding frame, which is stored in the memory 20, thereby calculating the movement vector of the block to be coded. Note that the movement vector is detected in units of macroblocks described above.

The movement compensator 21 performs movement compensation for the image data Xi' of the immediately preceding frame by using the movement vector and outputs movement-compensated data.

The loop filter 22 performs two-dimensional low-pass filter processing for the block to be coded, which is subjected to the movement compensation, and outputs the result as the predicted data $Xi\hat{}$.

The predicted data $Xi\hat{}$ is supplied to a delay unit 41 and the subtracter 12. The delay unit 41 delays the predicted data $Xi\hat{}$ by a time that the discriminator 25 requires to perform processing, and outputs the data to the terminal b of the switch 42. "0" is set at the terminal a of the switch 42 in order that "0" is added by the adder 19 in the intraframe processing.

The switch controller 29 closes the switch 30 to a terminal a for a DC component of the intraframe coding and to a terminal b for an AC component of the interframe or intraframe coding.

The DC component and the AC component will be described below with reference to FIG. 3.

In this embodiment, one image block is constituted by a total of 64 pixels, eight pixels in each of the row and column directions, as described above. FIG. 3 shows the correspondence between 64 DCT coefficients obtained by a DCT calculation. Referring to FIG. 3, a DC component at the upper left corner represents a mean value of the 64 pixels in the block and is called a direct current (DC) coefficient. The remaining 63 pixels are called alternate current (AC) coefficients which represent the magnitude of the AC-component electric power in that block.

The DC component of the block to be subjected to the intraframe coding processing is output from the terminal a of the switch 30 to a differential pulse-code modulator (DPCM) 31.

Figure 4:
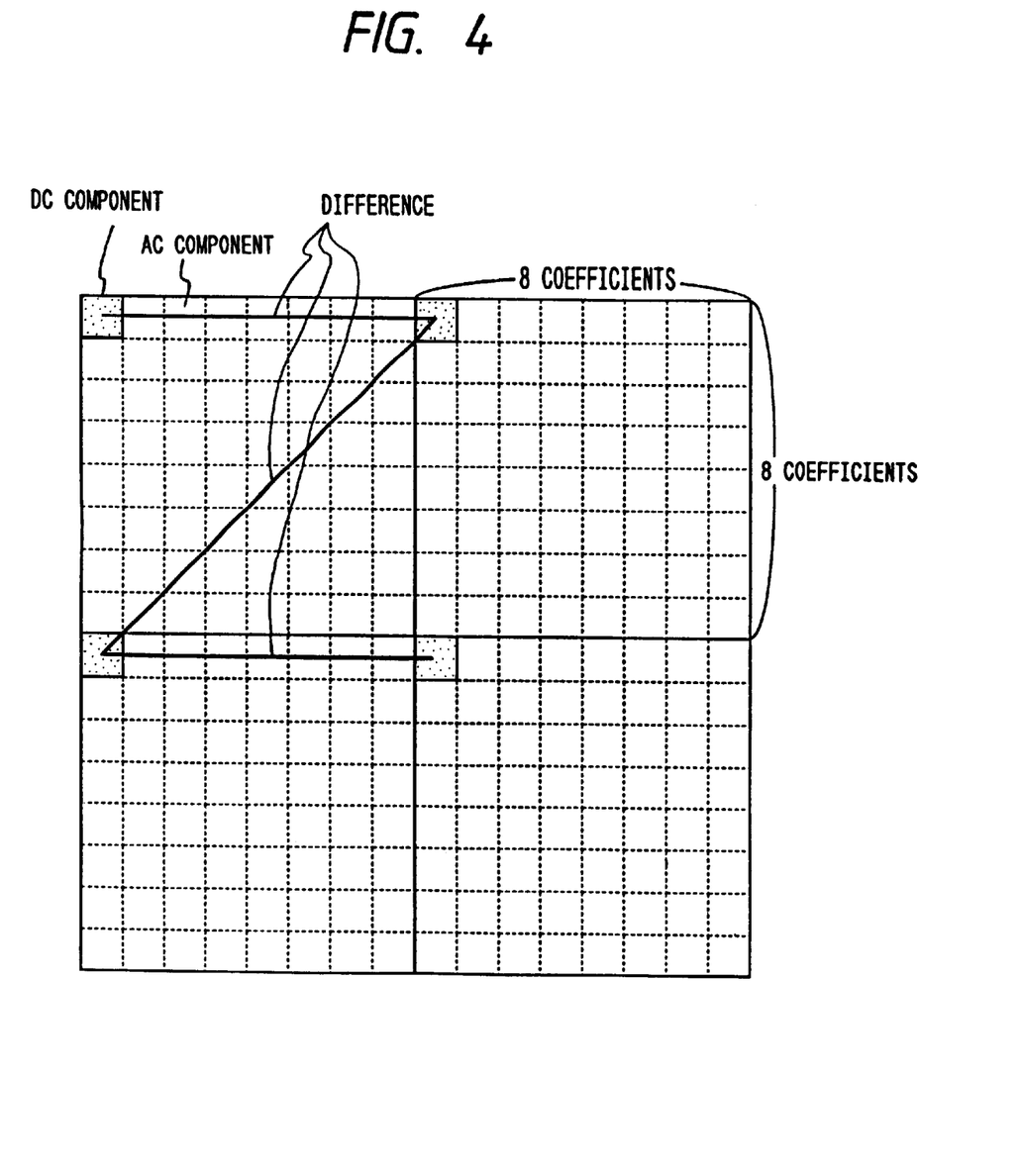
FIG. 4 is a view for explaining DC component coding processing according to the present invention.

The DPCM 31, as shown in FIG. 4, obtains differences between this DC component and the DC components of the four blocks that constitute the macroblock and supplies the differences to an entropy coder 32.

In general, a probability of the occurrence of "0" increases in a DC component from which differences are removed, and this produces a bias in information generated.

The entropy coder 32 assigns a short codeword to information with a high probability of occurrence and a long codeword to information with a low probability of occurrence, thereby reducing the quantity of data to be generated. The data thus reduced in quantity is supplied to a multiplexer 36.

Figure 3:
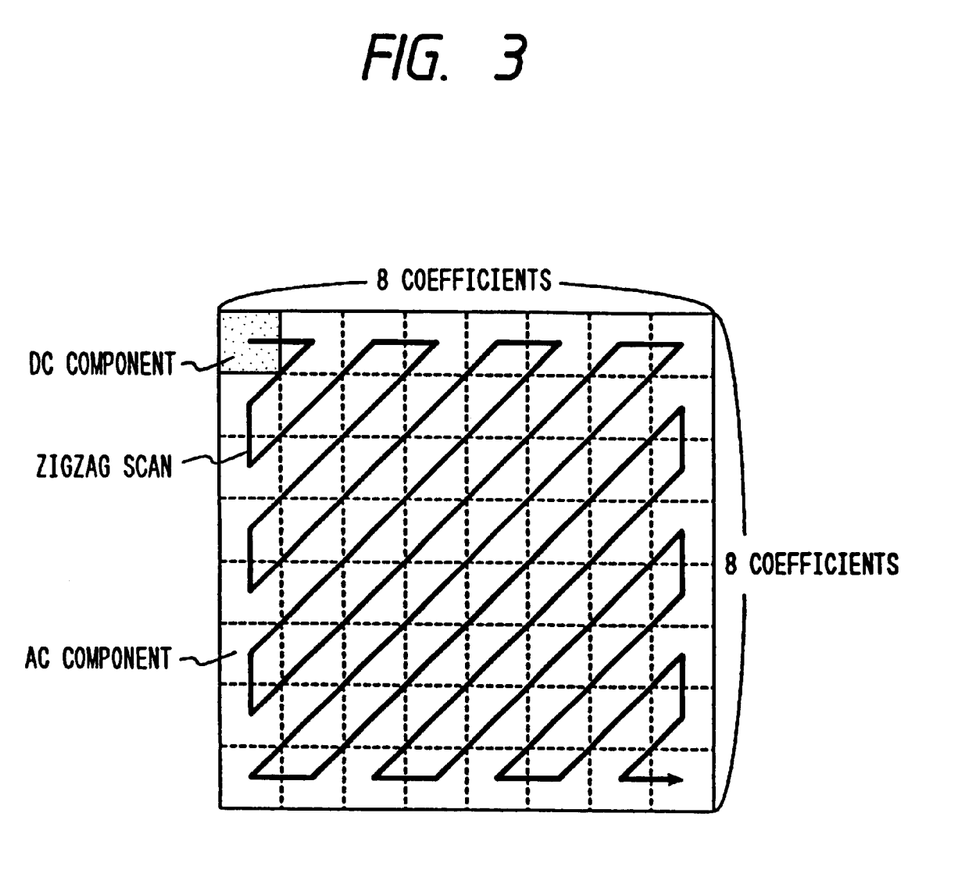
FIG. 3 is a view for explaining zigzag scan and DCT coefficients.

A zigzag scanner 33 scan-transforms the quantized AC components of the block subjected to the intraframe coding processing or the quantized transform coefficients of the block subjected to the interframe coding processing, as shown in FIG. 3. The transformed coefficients are supplied to a run length coder 34.

The run length coder 34 supplies sets of the number of "0"s and values other than "0" to an entropy coder 35.

The entropy coder 35 assigns short codes to run length codes having high frequencies of occurrence and long codes to those having low frequencies of occurrence, thereby reducing the quantity of data to be generated. The data thus reduced in quantity is supplied to the multiplexer 36.

The multiplexer 36 codes the output movement vector from the movement vector calculator 40 and synthesizes the coded signal and the output signals from the entropy coders 32 and 35. The multiplexer 36 outputs the result of synthesis to a buffer memory 37.

The buffer memory 37 temporarily stores the coded data and outputs the data at a predetermined transmission rate from an output terminal 38.

Note that in this embodiment, the output data from the output terminal 38 is controlled so as not to exceed the predetermined transmission rate by monitoring the data storage quantity in the buffer memory 37.

For example, when the data storage quantity in the buffer memory 37 is large, a quantization step controller 39 controls the operation of the quantizer 16 to decrease the generation quantity of data, thereby controlling the quantization step in a way which decreases the data storage quantity to a given value.

In contrast, when the data storage quantity in the buffer memory 37 is small, the quantization step controller 39 controls the operation of the quantizer 16 to increase the generation quantity of data, thereby increasing the data quantity to the given value. Note that the quantization step controller 39 similarly controls the inverse quantizer 17.

Figure 5:
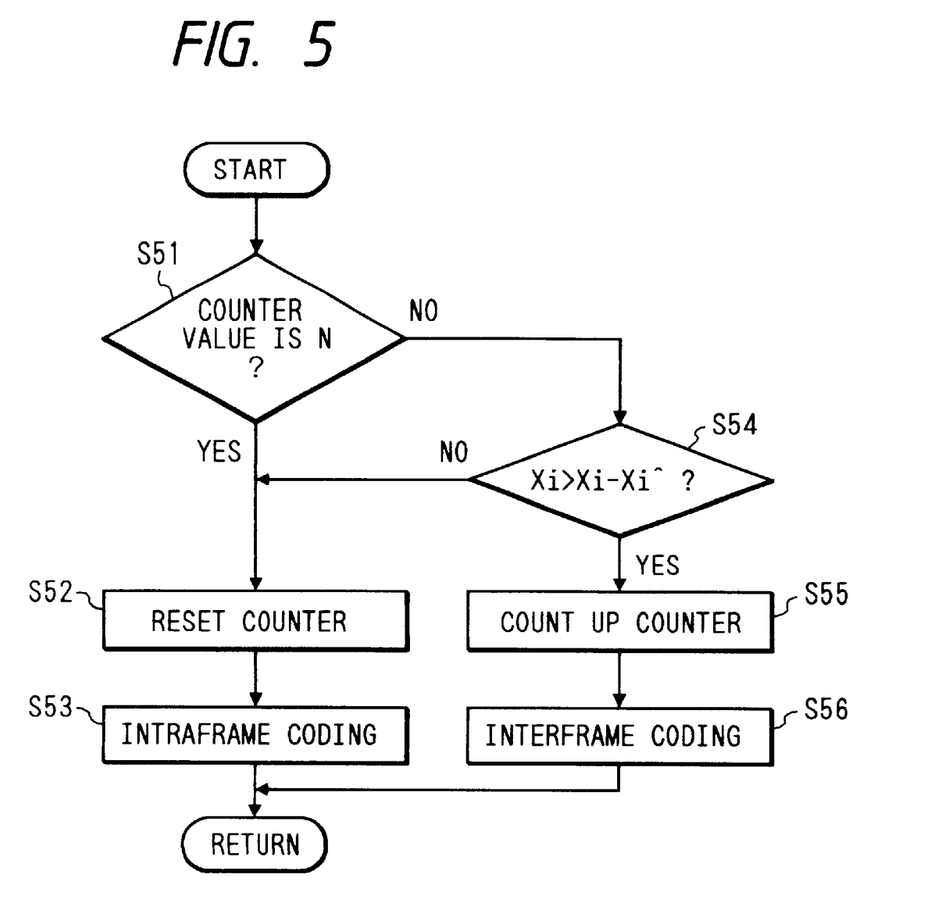
FIG. 5 is a flow chart showing a switching operation of a coding system of the first embodiment.

The switching between the interframe compression coding and the intraframe compression coding of the first embodiment will be described again with reference to the flow chart shown in FIG. 5.

In step S51, whether the value of the counter 26 is N (which is a preset value) is checked.

If the value of the counter 26 is N in step S51, the flow advances to step S52; if not, the flow advances to step S54.

The counter 26 is reset in step S52, and the flow advances to step S53 to perform intraframe coding.

In step S54, the data quantity of Xi is compared with that of $Xi-Xi\hat{}$ in units of macroblocks described above.

If $Xi > Xi-Xi\hat{}$ in step S54, the flow advances to step S55. If $Xi < Xi-Xi\hat{}$ in step S54, the flow advances to step S52.

The counter 26 is counted up in step S55, and the flow advances to step S56 to perform interframe coding.

In this embodiment, the above coding operations are switched in units of macroblocks described above.

As described above, the coding apparatus of the first embodiment according to the present invention has two or more coding systems and adaptively switches these coding systems so that the quantity of data is minimized. In addition, if an error occurs in a transmission path, the apparatus can prevent propagation of the error. Therefore, the quantity of data can be reduced without degrading image quality.

A coding apparatus of the second embodiment according to the present invention will be described in detail below.

Figure 6:
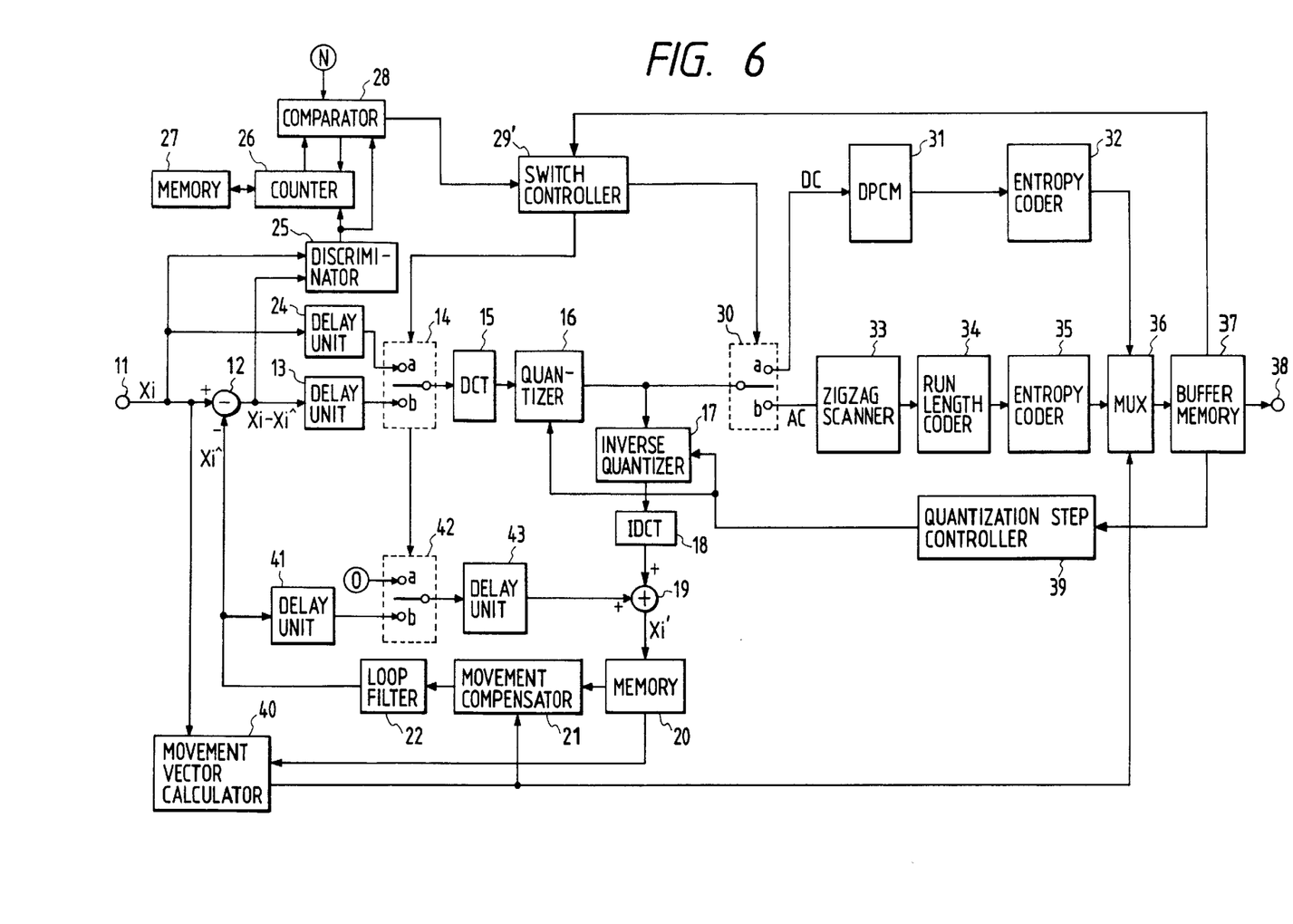
FIG. 6 is a block diagram showing a coding apparatus of the second embodiment according to the present invention.

FIG. 6 is a block diagram showing the arrangement of the coding apparatus of the second embodiment. Note that the same reference numerals as in FIG. 1 denote the same parts in FIG. 6 and a detailed description thereof will be omitted.

The second embodiment is different from the above first embodiment in that a switch controller 29' controls switching between interframe coding and intraframe coding by also taking into account the data storage quantity in a buffer memory in addition to the switching control of the first embodiment.

Figure 7:
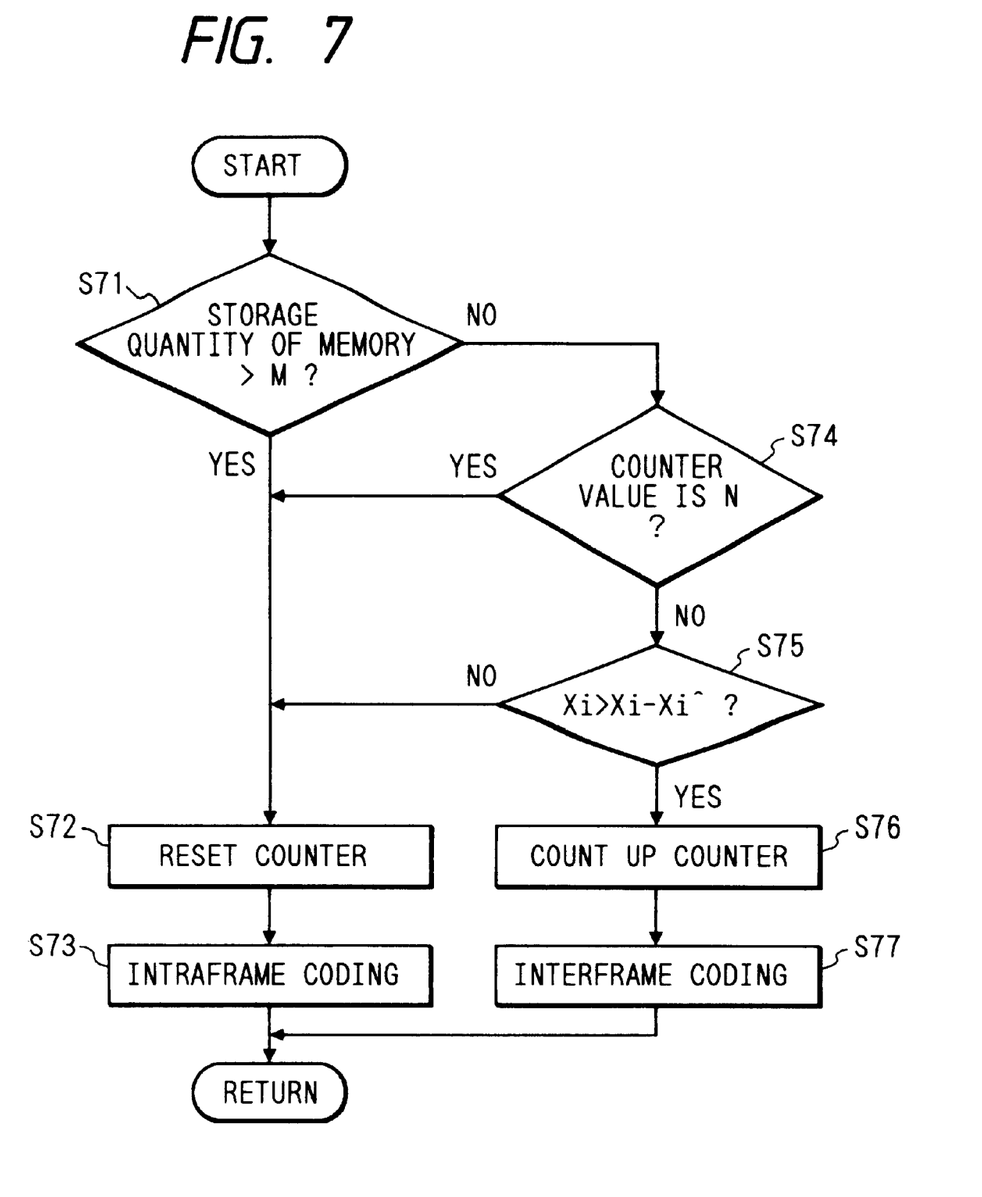
FIG. 7 is a flow chart showing a switching operation of a coding system of the second embodiment.

The switching between interframe compression coding and intraframe compression coding of the second embodiment will be described below with reference to the flow chart shown in FIG. 7.

In step S71, the data storage quantity in a buffer memory 37 is detected. If the data storage quantity detected is larger than M (which is a preset quantity) in step S71, the flow advances to step S72. If the data storage quantity is M or less, the flow advances to step S74.

The counter 26 is reset in step S72, and the flow advances to step S73 to perform intraframe coding.

In step S74, whether the counter value is N (which is a preset value) is checked. If the value of the counter 26 is N in step S74, the flow advances to step S72; if not, the flow advances to step S75.

In step S75, the data quantity of Xi is compared with that of Xi−Xi^ in units of macroblocks described above.

If Xi>Xi−Xi^ in step S75, the flow advances to step S76. If Xi≦Xi−Xi^ in step S75, the flow advances to step S72.

The counter 26 is counted up in step S76, and the flow advances to step S77 to perform interframe compression coding.

In this embodiment, the above coding operations are switched in units of macroblocks described above.

Note that the determination in step S71 is performed on the basis of the data storage quantity in the buffer memory 37, but this determination may also be performed in accordance with the remaining storage capacity of the buffer memory 37.

As described above, the coding apparatus of the second embodiment according to the present invention performs the switching between the coding systems by also taking into consideration the data quantity in the buffer memory in addition to the switching control of the coding apparatus of the first embodiment. This makes feasible transmission of data with the highest image quality that the apparatus can achieve.

Note that the present invention can be practiced in a variety of other forms without departing from the spirit and scope of the invention.

For example, the coding apparatus for adaptively switching between interframe coding and intraframe coding has been described in each of the above embodiments. However, the present invention is similarly applicable to a combination of interfield coding and intrafield coding or to a coding system which is a given combination of the coding systems described above.

In addition, the present invention can be applied to a coding apparatus for performing signal coding by adaptively switching a plurality of coding modes (including at least predictive coding).

Furthermore, although the quantization steps of the quantizer 16 and the inverse quantizer 17 are controlled on the basis of the data storage quantity in the buffer memory 37 in each of the above embodiments, the quantization steps can also be controlled in accordance with the remaining storage capacity of the buffer memory 37.

In other words, the foregoing description of embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. A coding apparatus comprising:
   a) block forming means for forming a block of sample values of an input signal;
   b) coding means having a first coding mode in which the block of sample values of the input signal is coded by using data representative of a difference between prediction values and the sample values of the block, and a second coding mode in which the block of the input signal is coded without using the data representative of the difference;
   c) a buffer memory for temporarily storing the coded data to be read out at a predetermined transmission rate;
   d) comparing means for comparing a data quantity of the data representative of the difference with a data quantity of data representing the sample values; and
   e) selecting means for selecting the coding mode according to a level of occupancy of the coded data stored in said buffer memory and a comparison result of said comparing means, said selecting means selecting the second coding mode as a current coding mode after the first coding mode has been selected consecutively for a predetermined number of times according to the level of occupancy of the coded data stored in said buffer memory and the comparison result of said comparing means.

2. An apparatus to claim 1, wherein said selecting means selects the coding mode in units of a predetermined number of blocks.

3. An apparatus according to claim 1, wherein said selecting means selects the first coding mode when said comparing means determines that the data quantity of the data representing the samples values is larger than the data quantity of the data of difference.

4. An apparatus according to claim 1, wherein said coding means performs coding by using a discrete cosine transform (DCT).

5. A coding apparatus comprising:
   a) coding means for coding an input image signal, said coding means having an intra-picture coding mode and an inter-picture coding mode;
   b) a buffer memory for temporarily storing the coded image data to be read out at a predetermined transmission rate; and
   c) selecting means for detecting a level of occupancy of the coded data in said buffer memory and selecting the coding mode in accordance with a detected occupation quantity, said selecting means selecting the intra-picture coding mode as a current coding mode after the inter-picture coding mode has been selected consecutively for a predetermined number of times according to the level of occupancy of the coded data in said buffer memory.

6. An apparatus according to claim 5, further comprising comparing means for comparing the intra-picture data with the inter-picture data,
   wherein said selecting means selects between the intra-picture coding mode and the inter-picture coding mode in accordance with a comparison result of said comparing means.

7. An apparatus according to claim 5, further comprising block forming means for forming a block of sample values of the input signal,
   wherein said coding means performs coding in units of the block.

8. An apparatus according to claim 7, further comprising counting means for counting the number of coding operations performed by the inter-picture coding mode,
   wherein said selecting means selects between the intra-picture coding mode and the inter-picture coding mode in accordance with an output from said counting means.

9. A coding apparatus comprising:
   a) first block forming means for forming a first block of sample values of an input signal;
   b) second block forming means for dividing the first block into a plurality of second blocks;
   c) coding means having a first coding mode in which the second blocks of the input signal are coded by using data representative of a difference between prediction values and values of the input signal of the second blocks, and a second coding mode in which the second blocks of the input signal are coded without using the data representative of the difference;

d) a buffer memory for temporarily storing the coded image data to be read out at a predetermined transmission rate;

e) detection means for detecting how many times in succession the first coding mode is performed;

f) comparing means for comparing a data quantity of the data representative of the difference with a data quantity of data representing the value of the input signal; and g) selecting means for selecting between the first coding mode and the second coding mode in accordance with a level of occupancy of the coded data in said buffer memory, an output of said comparing means and an output of said detection means, said selecting means selecting the second coding mode regardless of the level of occupancy of the coded data in said buffer memory and the output of said comparing means when said detection means detects that the first coding mode has been performed consecutively for a predetermined number of times.

10. An apparatus according to claim 9, wherein said detection means includes counting means for counting the number of coding operations performed on the first block by the first coding mode, wherein said counting means is reset after processing by the second encoding mode is executed.

11. An apparatus according to claim 9, wherein said selecting means selects the coding mode in a unit of the first blocks.

12. An apparatus according to claim 9, wherein each of said first and second coding modes performs coding by using discrete cosine transform (DCT).

13. An apparatus according to claim 12, wherein said second coding means performs coding so that a direct current (DC) component of DCT coefficients of a DCT block is coded according to difference between the DC components of DCT coefficients of the DCT blocks corresponding to the second blocks that constitute the first block.

14. A coding apparatus comprising:

a) coding means for coding an input image signal, said coding means having an intra-picture coding mode and an inter-picture coding mode;

b) a buffer memory for temporarily storing the coded image data to be read out at a predetermined transmission rate;

c) comparing means for comparing intra-picture data with inter-picture data; and d) selecting means for selecting the coding mode in accordance with a level of occupancy of the coded data in said buffer memory and a comparison result of said comparing means, said selecting means selecting the intra-picture coding mode as a current coding mode after the inter-picture coding mode has been selected consecutively for a predetermined number of times according to the level of occupancy of the coded data in said buffer memory and the comparison result of said comparing means.

15. An apparatus according to claim 14, wherein said coding means inter-picture codes a direct current component data of the input image signal transformed by said orthogonal transformation means, in the intra-picture coding mode.

16. A coding method comprising:

a) a coding step of coding in input image signal, said coding step having an intra-picture coding mode and an inter-picture coding mode;

b) a storing step of temporarily storing the coded image data to be read out at a predetermined transmission rate; and c) a selecting step of detecting a level of occupancy of the coded data stored in said storing step and selecting the intra-picture coding mode in accordance with a detected occupation quantity, said selecting step including a step of selecting the intra-picture coding mode as a current coding mode after the inter-picture coding mode has been selected consecutively for a predetermined number of times.

17. A coding method comprising:

a) a coding step of coding an input image signal, said coding step having an intra-picture coding mode and an inter-picture coding mode;

b) a storing step of temporarily storing the coded image data to be read out at a predetermined transmission rate;

c) a comparing step of comparing intra-picture data with inter-picture data; and d) a selecting step of selecting the coding mode in accordance with a level of occupancy of the coded data stored in said storing step and a comparison result in said comparing step, said selecting step including a step of selecting the intra-picture coding mode as a current coding mode after the inter-picture coding mode has been selected consecutively for a predetermined number of times according to the level of occupancy of the code data in said storing step and the comparison result in said comparing step.

18. A coding method comprising:

a) a block forming step of forming a block of sample values of an input signal;

b) a coding step having a first coding mode in which the block of sample values of the input signal is coded by using data representative of a difference between prediction values and the sample values of the block, and a second coding mode in which the block of the input signal is coded without using the data representative of the difference;

c) a storing step of temporarily storing the coded image data to be read out at a predetermined transmission rate;

d) a comparing step of comparing a data quantity of the data representative of the difference with a data quantity of data representing the sample values; and e) a selecting step of selecting a coding mode according to a level of occupancy of the coded data stored in said storing step and a comparison result in said comparing step, said selecting step including a step of selecting the second coding mode as a current coding mode after the first coding mode has been selected consecutively for a predetermined number of times according to the level of occupancy of the coded data stored in said storing step and the comparison result in said comparing step.

* * * * *

UNITED STATES PATENT AND TRADEMARK OFFICE
CERTIFICATE OF CORRECTION

PATENT NO. : 6,266,447 B1
DATED : July 24, 2001
INVENTOR(S) : Nobuhiro Hoshi et al.

It is certified that error appears in the above-identified patent and that said Letters Patent is hereby corrected as shown below:

<u>Title page,</u>
Item [56], References Cited, U.S. PATENT DOCUMENTS, "5,177,453" should read
-- 5,177,480 --; and insert -- 5,091,782   2/1992  Krause et al. ...382/56 --; and
-- 5,109,437   7/1992    Honda. ...382/56 --.

<u>Column 5,</u>
Line 27, "alternate" should read -- alternating --.

<u>Column 7,</u>
Line 44, "not" should read -- is not --.

<u>Column 8,</u>
Line 17, "samples" should read -- sample --.

Signed and Sealed this

Twenty-seventh Day of August, 2002

Attest:

JAMES E. ROGAN
*Attesting Officer*      *Director of the United States Patent and Trademark Office*